US008088403B2

(12) United States Patent
Dardelle et al.

(10) Patent No.: US 8,088,403 B2
(45) Date of Patent: Jan. 3, 2012

(54) METHOD FOR PREPARING MICROCAPSULES BY COACERVATION

(75) Inventors: Grégory Dardelle, Jonzier Epagny (FR); Valéry Normand, West Windsor, NJ (US)

(73) Assignee: Firmenich SA, Geneva (CH)

( * ) Notice: Subject to any disclaimer, the term of this patent is extended or adjusted under 35 U.S.C. 154(b) by 73 days.

(21) Appl. No.: 12/281,585

(22) PCT Filed: Mar. 15, 2007

(86) PCT No.: PCT/IB2007/050899
§ 371 (c)(1),
(2), (4) Date: Sep. 3, 2008

(87) PCT Pub. No.: WO2007/113706
PCT Pub. Date: Oct. 11, 2007

(65) Prior Publication Data
US 2009/0253165 A1   Oct. 8, 2009

(30) Foreign Application Priority Data

Apr. 4, 2006  (EP) ..................... 06112197

(51) Int. Cl.
*A61F 13/00* (2006.01)
*A61K 9/48* (2006.01)
*A61K 9/64* (2006.01)
*A61K 9/50* (2006.01)
*B01J 13/02* (2006.01)
*B05D 7/00* (2006.01)

(52) U.S. Cl. ........ 424/423; 424/451; 424/456; 424/492; 427/213.35; 514/962

(58) Field of Classification Search ..................... None
See application file for complete search history.

(56) References Cited

U.S. PATENT DOCUMENTS

| 5,035,896 | A | * | 7/1991 | Apfel et al. ................. 424/456 |
| 5,603,952 | A | * | 2/1997 | Soper .......................... 424/456 |
| 6,325,951 | B1 | * | 12/2001 | Soper et al. ................. 264/4.3 |
| 6,969,530 | B1 | | 11/2005 | Curtis et al. ................. 424/489 |
| 2004/0032036 | A1 | * | 2/2004 | Subramaniam et al. ....... 264/4.1 |

FOREIGN PATENT DOCUMENTS

| EP | 0 856 355 B1 | | 4/2004 |
| EP | 0856355 | * | 4/2004 |
| GB | 920868 | | 3/1963 |
| JP | 05292899 | * | 5/1993 |
| JP | 05292899 | | 11/1993 |
| WO | WO 96/20612 | | 7/1996 |
| WO | WO 2004/022220 A1 | | 3/2004 |
| WO | WO 2004/022221 A1 | | 3/2004 |

* cited by examiner

*Primary Examiner* — David J Blanchard
*Assistant Examiner* — Devang Thakor
(74) *Attorney, Agent, or Firm* — Winston & Strawn LLP

(57) ABSTRACT

The present invention relates to a method for preparing microcapsules by coacervation, and to the use of transglutaminase for cross-linking in complex coacervation. The present invention relates further to coacervation processes in general in which a material to be encapsulated is added to a solution comprising at least one colloid below the gelling temperature of the colloid. According to a method of the present invention, an emulsion or suspension of hydrophobic material is prepared after cooling a solution that includes hydrocolloids below the critical gelling temperature of a coacervate phase.

7 Claims, 3 Drawing Sheets

METHOD FOR PREPARING MICROCAPSULES BY COACERVATION

This application is a 371 filing of International Patent Application PCT/IB2007/050899 filed Mar. 15, 2007.

The present invention relates to a method for preparing microcapsules by coacervation, and to the use of transglutaminase for cross-linking in complex coacervation. The present invention relates further to coacervation methods in which a material to be encapsulated is added to a solution comprising at least one colloid below the gelling temperature of the colloid.

BACKGROUND OF THE INVENTION AND PROBLEMS TO BE SOLVED

Typical steps of coacervation processes generally involve (a) emulsification of a generally hydrophobic material in a solution comprising hydrocolloids, (b) coacervation (phase separation) implying the formation of a coacervate phase (c) wall formation by aggregation of the hydrocolloid around droplets of the emulsified hydrophobic material, and, (d) wall-hardening, which is generally achieved by cross-linking the hydrocolloid forming the wall thus rendering the process irreversible and making the resulting microcapsules insoluble in water, resistant to mechanical stress and to heat exposure.

The step of wall formation is generally driven by the surface tension difference between the coacervate phase, the water and the hydrophobic material. In most industrial coacervation processes, one of the hydrocolloids used in coacervation processes are selected from gellable proteins. These are easier to use and less prone to aggregation after the formation of the wall when the temperature is below the gelling temperature, if compared to non-gellable hydrocolloids. Gellification, in turn, is generally brought about by lowering the temperature of the reaction mixture below the gelling point of the gellable hydrocolloid. This well-recognized principle is illustrated in U.S. Pat. No. 2,800,457, where the process of a complex coacervation is disclosed in detail. In column 1 it is written: The mixture may thus be made by forming an aqueous sol of one colloid, emulsifying the selected oil therein, and mixing the emulsion with an aqueous sol of another colloid, or the two sols may be made and mixed and the oil emulsified therein. [ . . . ] The process steps, down to the gelation step, are carried out with the ingredients at a temperature above the gel point of the colloid materials used, and gelation is brought about by cooling.

Similarly, GB 920,868 and WO 2004/022220 A1 both disclose forming the emulsions, which include the hydrophobic material to be encapsulated, at a temperature above the gel point.

Today, many industrial coacervation processes are still conducted according to this principle. In view of this, it is an objective of the present invention to establish different ways of manufacturing microcapsules by coacervation. In particular, it is an objective of the invention to reduce the duration of the heating step and of shortening the overall time of the process.

A further objective of the present invention relates to the wall-hardening step. For some years already, efforts have been made to replace glutaraldehyde and formaldehyde, due to their toxicity, as hardening agents by enzymatic treatment with transglutaminase for cross-linking the hydrocolloid. Transglutaminase is an enzyme having its temperature optimum in the range of 45-55° C. and its pH optimum at about 6-7.

Accordingly, U.S. Pat. No. 6,475,542 B1 and U.S. Pat. No. 6,592,916 B2 disclose simple coacervation processes, in which the cross-linking step is started at 30° C. but then conducted at an elevated temperature of 40° C., being closer to the temperature optimum of the enzyme. In these references it is mentioned that the enzyme reaction is usually carried out at 10 to 60° C.

In EP 0,856,355 A2 a complex coacervation process with cross-linking by transglutaminase is disclosed. According to this teaching, temperature during cross-linking in complex coacervation may be adjusted to 20° C. to 27° C. or to 5 to 10° C., but preferably the latter. At this low temperature, pH is preferably adjusted to the optimum pH, that is, 7. Likewise, in U.S. Pat. No. 6,969,530 B1, cross-linking is carried out at very low temperatures, preferably about 5° C.

In view of the prior art regarding cross-linking by transglutaminase it is an objective to provide a coacervation process in which transglutaminase is used at conditions that are different from those so far disclosed. In particular, it is an objective to provide an industrially viable method of microencapsulation by complex coacervation at temperatures not requiring prolonged cooling and/or heating to extreme temperatures. It is an objective to conduct cross-linking at about ambient or slightly above-ambient temperatures, but still below the enzyme optimum of 50° C., in order to avoid energy expenditure by excessive heating. Especially with the hardening step by transglutaminase, which generally takes from 5 to 24 hours and thus is the longest step of the entire manufacturing process, there is a vital interest in avoiding the maintenance of elevated (30° C. or above) or below-ambient temperatures (10° C. or lower). In other words, it is an objective of the present invention to provide an overall safer and more economic process for manufacturing microcapsules by coacervation.

It is an objective of the present invention to provide a process that is useful to encapsulate a large variety of different materials, including highly volatile and/or heat sensitive compounds. Flavours and fragrances frequently fall in this category. It is a particular objective to reduce loss of volatile components of the material to be encapsulated during the encapsulation process. For this reason it is an objective to provide a method of microencapsulation at comparatively low temperatures, thus avoiding loss of volatiles by evaporation. Furthermore, bioactive principles such as flavours, fragrances, drugs, for example, encompass heat sensitive compounds. For avoiding degradation of such compounds, low temperature encapsulation processes would provide an additional advantage.

Furthermore, the present invention has the objective of providing micro-capsules fulfilling worldwide religious and/or nutritional requirements. In particular, the present invention has the objective of using hydrocolloids and in particular gelatine that is kosher and/or halal.

In this respect, WO 96/20612 features the use of warm water fish gelatine in coacervation processes. Accordingly, it is taught that microencapsulation by complex coacervation has to be conducted at elevated temperatures, notably at temperatures of about 33-35° C. While the step of "microencapsulating" in this reference probably refers to the step of wall formation, it again becomes an objective of the present invention to manufacture micro-capsules at lower temperatures and hence, in a more economical way. It is in general an objective of the present invention to use warm water fish gelatine in a coacervation process, because it has been shown to provide capsule-walls having good heat-resistance and physical stability against shear forces. Furthermore, fish gelatine, while being kosher, is susceptible of obtaining halal status.

Given that the gelation temperature of warm water fish gelatine is generally above 27° C., it seems, according to current knowledge, virtually impossible to perform a complex coacervation process below this temperature. It is thus an objective of the present invention to use warm water fish gelatine in coacervation processes, and in particular complex coacervation processes and, at the same time, perform the step of micro-encapsulation (wall formation) below the temperatures indicated in the prior art.

SUMMARY OF THE INVENTION

Remarkably, the present inventors found that in coacervation processes, the step of adding a hydrophobic material to a hydrocolloid solution may be conducted at temperatures below the gelling temperature of a coacervate phase, the latter generally comprising gelatine. In stark contrast to the teaching according to the general knowledge, the formation of the wall of microcapsules obtained by coacervation can be initiated below the gelling temperature of the gelatine-based coacervate phase.

Accordingly, in a first aspect, the present invention provides a method of micro-encapsulating a hydrophobic material by coacervation, the method comprising the steps of:
preparing a hydrocolloid solution by dissolving at least one protein and, optionally, a non-protein polymer, in water;
cooling the hydrocolloid solution to a temperature below the gelling temperature of a coacervate phase based on the protein;
preparing, after the cooling step, an emulsion and/or suspension by emulsifying and/or suspending a hydrophobic material in the solution;
forming a colloid wall comprising protein around droplets and/or particles of the hydrophobic material present in an emulsion and/or suspension; and,
cross-linking the colloid wall.

In a further aspect, the present invention provides a method of preparing microcapsules by complex coacervation, the method comprising the step of cross-linking a hydrocolloid wall of the microcapsules with transglutaminase at a temperature in the range of 13-25° C. and at a pH in the range of 4-6.5.

In another aspect, the present invention provides a method of preparing microcapsules by complex coacervation, the method comprising the step of cross-linking a hydrocolloid wall comprising warm water fish gelatine with transglutaminase, at a temperature in the range of 13-25° C.

An important advantage of the present invention resides in the fact that to a large extent, the coacervation process of the present invention can be conducted, if desired, at room temperature (RT=25° C.) or at temperatures slightly above or below ambient temperatures, for example, ±10° C. of RT. Accordingly, energy expenditure otherwise required for cooling and/or heating may be minimized. Furthermore, loss through evaporation of volatile principles and/or thermal degradation can be reduced if the process is conducted in the absence of extensive heating. In particular, the method allows for conducting those steps involving the optionally volatile and/or thermal sensitive hydrophobic material at relatively low temperatures, while other steps, such as dissolving hydrocolloids, may still be conducted at elevated temperatures.

Surprisingly, in the method of the present invention, if phase separation is brought about by lowering the pH, the step of cross-linking may be conducted at about the pH adjusted for phase separation. Accordingly, repetitive adjustment of pH to the optimum of the respective step can be reduced.

Surprisingly, the present invention provides the use of warm water fish gelatine and cross-linking by transglutaminase, which entails advantages in terms of safety in general as well as in halal and kosher status.

DETAILED DESCRIPTION OF THE PREFERRED EMBODIMENTS

Figure 1:
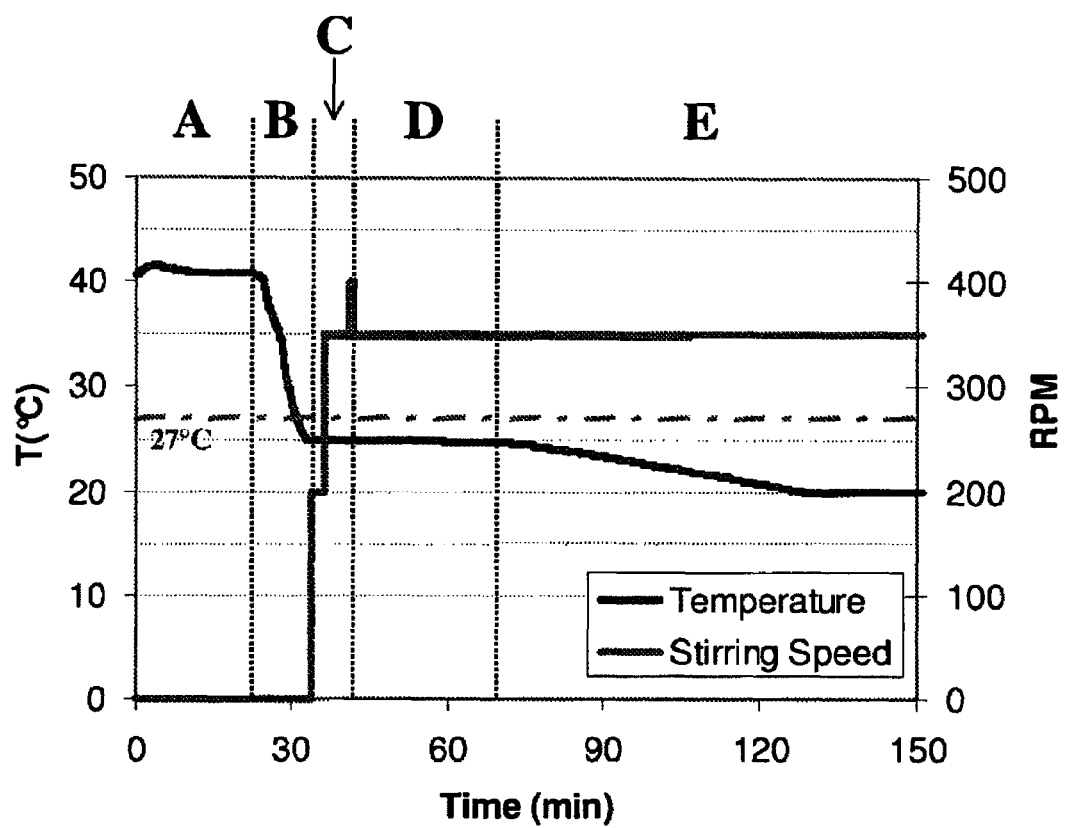
FIG. 1 shows the evolution of temperature and stirring speed as well as major process steps in the course of the method according to the present invention. Step A is the preparation of a diluted solution of gum Arabic and gelatine, B represents a fast cooling step, C refers to the introduction of the oily phase, during phase D, the temperature is kept at 25° C., and during step E cooling to the final temperature occurs.

The present invention provides method of micro-encapsulating a hydrophobic material by coacervation. A hydrophobic material, for the purpose of the present invention, may be in the liquid or solid state during the method of the invention. Preferably, it is liquid. Hydrophobic materials are generally regarded as materials that are not miscible in water at 25° C. and, when added to it, form a separate, hydrophobic phase. For the purpose of the present invention, the term hydrophobic material includes material that is in the solid state at the temperatures generally employed in coacervation processes, that is, at less than or equal to about 50° C. Such solid material may be present in the form of crystals, for example. Preferably, if the solid material is liquefied by heating above its melting point, it forms a separate phase in water at that temperature.

According to a preferred embodiment of the present invention, the hydrophobic material comprises flavours, fragrances, fats, oils, mouth-feel enhancers, neutraceuticals, drugs, other bioactive ingredients or mixtures thereof.

The terms "flavours" and "fragrances" as used herein are deemed to define a variety of flavour and fragrance materials of both natural and synthetic origins. They include single compounds or mixtures. Specific examples of such components may be found in the literature, e.g. in Fenaroli's Handbook of Flavor Ingredients, 1975, CRC Press; synthetic Food Adjuncts, 1947 by M. B. Jacobs, edited by van Nostrand; or Perfume and Flavor Chemicals by S. Arctander 1969, Montclair, N.J. (USA). These substances are well known to the person skilled in the art of perfuming, flavouring and/or aromatising consumer products, i.e. of imparting an odour and/or flavour or taste to a consumer product traditionally perfumed or flavoured, or of modifying the odour and/or taste of the consumer product.

Neutraceuticals are edible materials such as foods or food ingredients that provide medical or health benefit to a human or animal individual upon consumption. Neutraceuticals include, for example, polyunsaturated fatty acids and/or oils comprising them, vitamins, minerals, co-enzyme Q, carnitine, botanical extracts, for example from gingseng, ginko biloba, Saint John's Wort, Saw Palmetto, functional foods such as oat, bran, psyllium, lignins, prebiotics, canola oil and stanols, for example. Preferably, the hydrophobic material comprises flavours and/or fragrances. Many bioactive principles, but in particular flavours and/or fragrances, or compositions of flavours and/or fragrances, have a high proportion of volatile compounds and/or components.

Accordingly, in an embodiment, the ingredient comprises at least 5 wt. %, preferably at least 10 wt. %, preferably at least 20 wt. %, more preferably at least 30 wt. % and most preferably at least 40 wt. % of chemical compounds having a vapour pressure of $\geq 0.007$ Pa at 25° C.

Preferably, at least 10 wt. % have a vapour pressure of $\geq 0.1$, more preferably, at least 10 wt. % have a vapour pressure of $\geq 1$ Pa at 25° C., and most preferably, at least 10 wt. % have a vapour pressure of $\geq 10$ Pa at 25° C. The value of 0.007 Pa at 25° C. is selected because it encompasses most of the compounds used by the skilled flavourist and/or perfumer. Compounds meeting these criteria are generally regarded as having a volatile character. In addition, compounds that remain odourless due to a lower volatility are excluded. The limit of 10 wt % of such compounds is regarded to constitute a substantial part of the ingredient. The method of the present invention, however, allows for efficient encapsulation of more volatile ingredients being present in higher amounts of the total ingredients.

For the purpose of the present invention and for the sake of convenience, the vapour pressure is determined by calculation. Accordingly, the method disclosed in "EPI suite"; 2000 U.S. Environmental Protection Agency, is used to determine the concrete value of the vapour pressure of a specific compound or component of the ingredient. This software is freely available and is based on average values of vapour pressures obtained by various methods of different scientists.

The fragrance compound limonene is adduced for illustrating the determination of vapour pressure by calculation: by applying the method "EPI suite", limonene is calculated to have a vapour pressure of about 193 Pa at 25° C.

One of the methods of the present invention comprises the step of preparing a hydrocolloid solution by dissolving at least one protein and, optionally, a non-protein polymer in water. Preferably, the non-protein polymer is charged oppositely to the protein. The word "comprise" or "comprising", for the purpose of the present invention is intended to mean "including amongst other". It is not intended to mean "consisting only of".

The present invention encompasses "simple" and "complex" coacervation. In simple coacervation, protein alone is used to form a capsule wall as phase separation is taking place. Complex coacervation refers to methods in which a generally oppositely charged non-protein polymer and a protein polymer together form the capsule wall. According to the principles of complex coacervation the present invention method provides the optional addition of an oppositely charged non-protein polymer, preferably a polysaccharide, to the hydrocolloid solution.

The term colloids generally refers to hydrocolloids, that is polymeric substances that can be dissolved in water, optionally at elevated temperatures up to 90° C., for example. These encompass polymers such as proteins, polysaccharides and polyacids, for example, that are generally known to be useful in coacervation methods.

Typical non-protein polymers useful in complex coacervation methods include, in particular, negatively charged polymers. For example, they may be selected from gum arabic, xanthan, alginate salts, cellulose derivatives, for example carboxymethyl cellulose, pectinate salts, carrageenan, polyacrylic and methacrylic acid, and/or mixtures thereof. Further suitable non-proteins can be derived from the literature, for example from WO 2004/022221, page 4, lines 27-29.

Proteins useful in coacervation processes include albumins, vegetable globulins and gelatines. The molecular weight of the protein is typically in the order of 40,000 to 500,000 preferably 20,000 to 250,000. Some protein aggregates, however, may have molecular weights in the millions.

Preferably, the protein is a gelatine. It is preferable to use gelatine having good physicochemical and chemical properties as typified by good film forming ability, amphoteric properties, the controllability of the quantity of charges by pH, and, preferably, the occurrence of the change from solution to gel at a critical temperature. Stated specifically, any gelatine that satisfies the specification for use in production of microcapsules may be employed.

The gelatine may be fish, pork, beef, and/or poultry gelatine, for example. According to a preferred embodiment, the protein is fish, beef or poultry gelatine. According to a more preferred embodiment, the protein is warm water fish gelatine. Preferably, the warm water fish gelatine has a bloom of from about 150 to about 300 bloom, more preferably from about 200 to about 300 bloom. Preferably, the warm water fish gelatine has $\geq 250$ bloom. According to the general knowledge, warm water fish are fish that are capable of tolerating water above 27° C. over prolonged time.

According to a preferred embodiment of the present invention the protein is halal. According to a further preferred embodiment the protein is kosher.

Preferably, in the aqueous hydrocolloid solution, the protein is present in an amount of from 0.5-3.5 wt %, preferably 1-2 wt. %.

If present, the polysaccharide is present in amounts of from 0.5-3.5 wt %, preferably 1-2% wt. % in the aqueous solution.

The above concentrations may be obtained after an optional dilution step during which more concentrated stock-solutions are brought to concentrations useful for the steps of inducing the formation of the coacervate phase and/or forming capsule walls. An advantage of starting from more concentrated stock-solutions is that emulsion particle size can more easily be controlled in more concentrated hydrocolloid solutions.

According to a preferred embodiment, the methods of the present invention comprise a step of inducing the formation of a coacervate phase. The coacervate phase is generally based on the protein and, optionally, the non-polymer compound. This step is also referred to as phase separation. This step may be preferably accomplished by modifying, preferably lowering, the pH to or below the iso-electric point of the protein. If a non-protein polymer, for example a polysaccharide is present, the pH is preferably adjusted so that the positive charges on the proteins are neutralized by the negative charges on the non-protein polymer.

Phase separation may be induced by various other ways, in general by changing the physico-chemical environment of the solution. Depending on the kind of coacervation process (simple; complex) different ways of inducing phase separation can be applied. For example, phase separation may be realized by salting out, by adding a second high molecular weight component so as to induce entropic phase separation of the wall material, for example.

The methods of the present invention may comprise the step of cooling the hydrocolloid solution to a temperature below the gelling temperature of a coacervate phase based on the gelatine. In simple coacervation processes, the coacervate phase is free of a polysaccharide, whereas in complex coacervation processes the coacervate phase comprises the protein and at least one polysaccharide. For the sake of convenience, for the purpose of the present invention, the gelling temperature of the gellable protein used in the coacervation process of the present invention is considered to be equal to the gelling temperature of the coacervate phase of the present invention.

The determination of the gelling temperature of the gellable protein, preferably gelatine, needs to be established, in part by experiment. For the purpose of the present invention, the gelling temperature corresponds to the critical temperature Tc described by Normand V. and Parker A. in "Scaling the Dynamics of Gelatin Gels", $3^{rd}$ International symposium on Food Rheology and Structure, 2003, 185-189.

Temperature Tc for any given gellable protein corresponds to the temperature at which the gel-forming dynamics exceed the gel-melting dynamics in a system. Interestingly, as indicated by Normand and Parker in 2003, the critical temperature for any specific gellable protein is independent of concentration, despite of the impact of the latter on the kinetics of gel formation.

Accordingly, for the purpose of the present invention, the gelling temperature, Tc, with an exactitude of ±1° C., is determined on the basis of equation 1 in Normand and Parker, 2003:

$$\frac{G(t)}{\varepsilon^\alpha (c-c_c)^\mu} = g\left(\frac{t}{\varepsilon^\beta (c-c_c)^\nu}\right) \qquad \text{Equation 1}$$

in which $\varepsilon$ is the reduced temperature, $\varepsilon = 1 - T/Tc$ in ° C., C is the concentration expressed as weight fraction, t is time and g(x) is a scaling function defining the shape of the mastercurve according to Normand and Parker (2003). The four exponents and the critical concentration, Cc, are fitting parameters. For the purpose of the present invention, the exponents are considered to be constants, that is, $\alpha=3.2$, $\beta=-9.3$, $\mu=2.3$ and $\nu=-2.6$. Cc is considered to be 0. These values are used as approximate simplification but are generally found to match the situation encountered with most gelatines.

Values for determining G(t), the only unknown element for calculating Tc, are measured experimentally, according to the experimental setting provided in the following.

Accordingly, a Physica MCR 300 rheometer is employed (Anton Paar GmbH, Germany, www.anton-paar.com), fitted with a 5 cm diameter, 2° angle cone and plate geometry. The gap is 50 μm. Oscillatory measurements are made at a frequency of 1 Hz and a constant 1% strain.

Four (4) individual experiments are conducted for a duration of 20 hours, during which gel formation is monitored. From these experiments, a master curve may be established, from which the critical temperature, Tc, can be deduced following Normand and Parker (2003). In particular, four aqueous solutions of gellable proteins are prepared, two of which are at concentrations of 5 wt. %, the other two at 10 wt. %. Solutions are prepared by dissolving the gelatine in water by heating the solution to 60° C. and maintaining the temperature for 30 minutes under light stirring conditions. Following this, the solutions are cooled at a rate of 2° C./min to the test temperatures.

For each of the two concentrations, two experimental temperatures, 15° C. and 20° C., respectively, are tested.

Starting from the time the experimental temperature for a given sample is reached, rheological measurements of G(t) are made by oscillation as indicated above. The value obtained for G(t) characterises the mechanical resistance provided by a gel being formed. G(t) measurements are taken for a total of 20 hours, each minute in the first hour, every 10 minutes in the second hour, and once an hour from the beginning of the third hour.

From the values obtained from the measurements over time of each of the four samples, curves similar to FIG. 1 of Normand and Parker (2003) may be established. The critical temperature is the temperature Tc at which the best fit for the measured value is obtained, other parameters (Cc, $\alpha$, $\beta$, $\mu$, $\nu$) being constant. The best fit is represented by a master curve based on Equation 1, which corresponds to FIG. 2 of Normand and Parker (2003). In this way, the critical temperature is determined at a preciseness of ±1° C., as mentioned. Accordingly, from the above experimental setting in conjunction with Equation 1, the critical gelling temperature of a given gellable protein may be established. In accordance with a method of the present invention, the hydrocolloid solution comprising the gellable protein is cooled below this temperature, which is taken to be the gelling temperature of the coacervate phase.

For illustration, it can be said that the gelling temperature of pork gelatine is generally in the range of 29° C.-36° C. The exact gelling temperature, however, of any gelatine selected from any pork, beef, poultry or warm water fish gelatine, for example, may be determined by the above methodology. According to the present invention, the temperature of the solution is preferably reduced to or below these temperatures. According to one of the methods of the present invention, this cooling step takes place before adding the hydrophobic material as detailed further below. Accordingly, the solution is cooled to 0-5° C., preferably 1-4° C., more preferably 2-3° C. below the gelling temperature of the gelatine used, before adding the hydrophobic material.

According to a preferred embodiment, the hydrophobic material is added to the solution with the solution having a temperature in the range of 22-33° C., preferably 24-32° C. The exact temperature will depend on the gelling temperature of the particular protein used, as indicated above on the example of gellable proteins such as gelatine.

The methods of the present invention may comprise the step of preparing, after the cooling step, an emulsion and/or suspension by emulsifying and/or suspending a hydrophobic material in the solution. Preferably, the cooling step prior to addition of adding the hydrophobic material by suspension or emulsion is performed comparatively quickly. For example, this cooling step preferably takes place at about 1.4 to 4° C./min, preferably at 1.8 to 2.5° C./min.

The emulsion and/or suspension may be prepared in a conventional manner. Preferably, the hydrophobic material is slowly added during 3-10 min, preferably 4-6 min, with a stirrer being adjusted to 300-400 rpm. By adjustment of the stirrer speed, the size of emulsified droplets of hydrophobic material may be adjusted to an average diameter of 20-1000 μm, preferably 100-800, more preferably 150-700 μm, and most preferably of 250-350 μm. Average refers to the arithmetic mean. For the sake of simplicity, the diameter of the emulsified droplets or the suspended particles is taken as the size of the microcapsules of the present invention.

The methods of the present invention may comprise a step of forming a colloid wall comprising the protein around droplets of the hydrophobic material present in an emulsion and/or suspension. This step takes place spontaneously once the step of formation of a coacervate phase is induced.

The methods of the present invention preferably comprise a step of cross-linking the colloid wall. Cross-linking may be performed in any way, for example by adding sufficient amounts of formaldehyde and/or glutaraldehyde. Preferably, however, cross-linking is effected enzymatically. According to a preferred embodiment, cross-linking is effected with the enzyme Transglutaminase. Preferably, transglutaminase is added at 10-100, preferably 30-60 activity units per gram of gelatine. This enzyme is well described and commercially obtainable. The temperature optimum of commercially available specimen of this enzyme is generally above 40° C. Accordingly, it is an advantage of the present invention that the cross-linking may be conducted at ambient temperatures, or, slightly cooled and/or heated temperatures, for example, relatively close to the temperature optimum of the enzyme.

According to an embodiment of the invention, cross-linking, in particular with transglutaminase, is conducted at a temperature in the range of 11-27° C. For example, cross-linking may take place at a temperature in the range of 11-27° C., preferably 12-26° C., more preferably 13-25° C., even more preferably 14-24° C., e.g. 14-22° C.

Similarly, the pH during the cross-linking step is preferably adjusted to a level at which cross-linking can effectively be conducted. For example, if cross-linking is catalysed by the action of transglutaminase, the pH may preferably be adjusted to 3-8, preferably 3.5-7. According to a preferred embodiment, pH is adjusted to 3.5-6.5, preferably 4-6, most preferably 4-5.5. An advantage of the present invention is that cross-linking may take place at about the same pH as the initiation of phase separation, as preferably induced by pH lowering. The fact that no or only optional pH adjustment is necessary reduces a further process step and thus constitutes a further advantage of the present invention.

The microcapsules produced by the methods of the present invention can be used in many kinds of applications or consumer end products, for example those in the fields of flavours and fragrances. In particular, they can be used for the flavouring of baking applications, meat, tobacco, frying and canning (thermal processing). On the other hand, in the field of perfumery, they can be used for the perfuming of various consumer products such as household cleaners, pre-moistened wipes and personal care products. Therefore, perfuming or flavouring compositions comprising microcapsules according to the invention, optionally together with other perfuming or flavouring co-ingredients, are also aspects of the present invention.

MODES OF CARRYING OUT THE INVENTION

The invention will now be described for mere illustrative but not limitative purposes in the examples below.

Example 1

Microencapsulation of Limonene within a Hydrocolloid Shell by a Complex Coacervation Process Warm water fish gelatine (200 Bloom, supplied by Weishardt) having a gelling temperature of 27° C. and gum Arabic (Efficacia®, from CNI) are used as the hydrocolloids. A stock solution of gelatine (solution A) is prepared by mixing 180 g of warm deionised water and 20 g of gelatine in a vessel until it is completely dissolved; the solution is then maintained at 40° C. A stock solution of gum Arabic (solution B) is prepared by mixing 180 g of cold deionised water and 20 g of gum Arabic in a vessel until it is completely dissolved; the solution is then warmed and kept at 40° C.

105.4 g of solution A is mixed with 70.3 g of solution B in a vessel under gentle agitation (the gelatine/gum Arabic ratio is 1.5:1). The pH is adjusted to 4.6 with a 50% w/w aqueous lactic solution.

70.3 g of limonene is slowly added to the gelatine and gum Arabic mixture and homogenised with a stirrer at 350 RPM during 5 min, so as to reach an average droplet size of 300 µm. The system is then diluted by the addition of 354.1 g of warm deionised water, which brings the total hydrocolloid concentration to 3.4% w/w. The mixture is finally cooled to 20° C. at a rate of 0.5° C./min. The stirring speed is slightly decreased, the pH is adjusted to 4.5 and 4.22 g of transglutaminase (ACTIVA® WM supplied by Ajinomoto, having 100 UA/g of enzyme) is added to the mixture. Cross-linking is allowed to proceed overnight at 20° C.

In this way, an aqueous suspension of microcapsules is obtained.

Example 2

Microencapsulation by Complex Coacervation Process—Addition of Limonene Below Gelling Temperature Warm water fish gelatine (200 Bloom, supplied by Weishardt) having a gelling temperature of 27° C. and gum Arabic (Efficacia®, from CNI) are used as the hydrocolloids. A stock solution of gelatine (solution A) is prepared by mixing 180 g of warm deionised water and 20 g of gelatine in a vessel until it is completely dissolved; the solution is then maintained at 40° C. A stock solution of gum Arabic (solution B) is prepared by mixing 180 g of cold deionised water and 20 g of gum Arabic in a vessel until it is completely dissolved; the solution is then warmed and kept at 40° C.

105.4 g of solution A is mixed with 70.3 g of solution B in a vessel under gentle agitation (the gelatine/gum Arabic ratio is 1.5:1). The system is diluted by the addition of 354.1 g of warm deionised water, which brings the total hydrocolloid concentration to 3.4% w/w. The solution is maintained at 40° C. and the pH is adjusted to 4.6 with a 50% w/w aqueous lactic solution. The mixture is then quickly cooled to 25° C. at a rate of 2° C./min.

At 25° C., 70.3 g of limonene is slowly added to the gelatine and gum Arabic mixture and homogenised with a stirrer at 350 RPM during 5 min, so as to reach an average droplet size of 300 µm. The emulsion is then maintained at 25° C. during 20 min and finally slowly cooled to 20° C. at a rate of 0.1° C. min$^{-1}$. The stirring speed is slightly decreased; the pH is adjusted to 4.5 and 4.22 g of transglutaminase (ACTIVA® WM supplied by Ajinomoto) is added to the mixture. Cross-linking is allowed to proceed overnight at 20° C.

Figure 2:
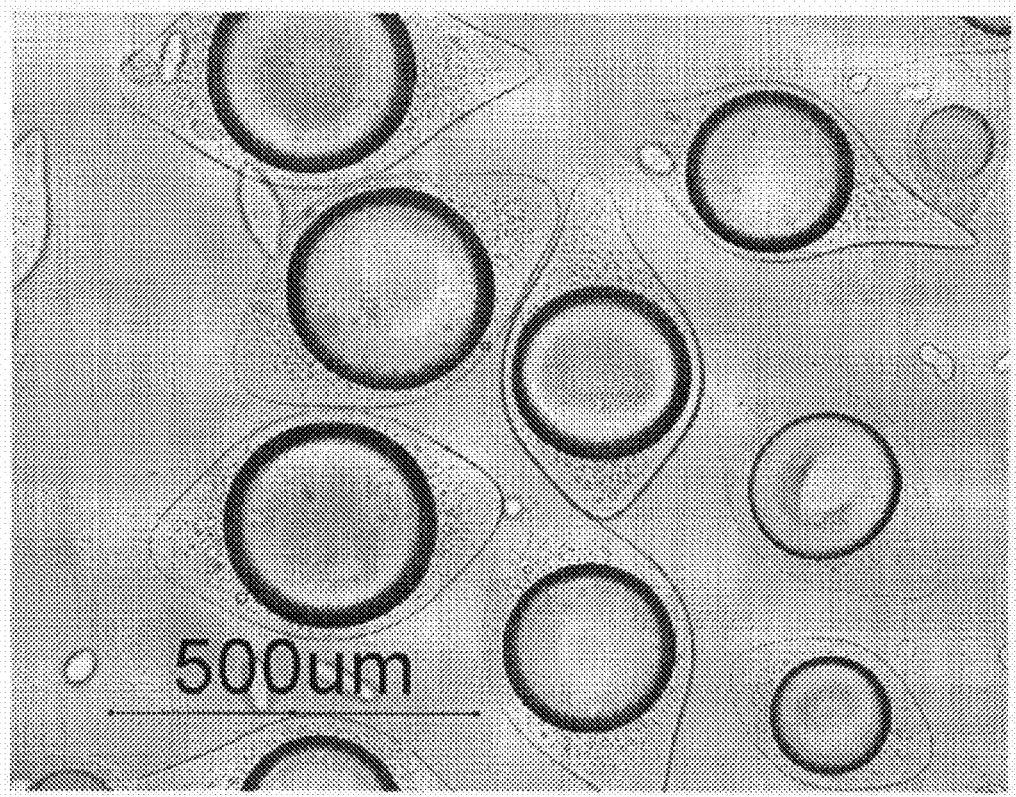
FIG. 2 is a microscopic view of the microcapsules obtained in Example 2.

The microcapsules thus obtained are shown in FIG. 1. The microcapsules have an average diameter of 250 µm. FIG. 2 illustrates the evolution of the process in terms of temperature and stirring speed over time.

Example 3

Microencapsulation by Complex Coacervation Process with Pork Gelatine

Pork gelatine type A (275 Bloom) having a gelling temperature above 32° C., establish according to the methodology given in the description, and gum Arabic (Efficacia®, from CNI) are used as the hydrocolloids. A stock solution of gelatine (solution A) is prepared by mixing 180 g of warm deionised water and 20 g of gelatine in a vessel until it is completely dissolved; the solution is then maintained at 40° C. A stock solution of gum Arabic (solution B) is prepared by mixing 180 g of cold deionised water and 20 g of gum Arabic in a vessel until it is completely dissolved; the solution is then warmed and kept at 40° C.

105.4 g of solution A is mixed with 70.3 g of solution B in a vessel under gentle agitation (the gelatine/gum Arabic ratio is 1.5:1). The system is diluted by the addition of 354.1 g of warm deionised water, which bring the total hydrocolloid concentration to 3.4% w/w. The solution is maintained at 40°

C. and the pH is adjusted to 4.5 with a 50% w/w aqueous lactic solution. The mixture is then quickly cooled to 31° C. at a rate of 2° C. min−1.

70.3 g of limonene is slowly added to the gelatine and gum Arabic mixture and homogenised with a stirrer at 350 RPM during 5 min, so as to reach an average droplet size of 300 μm. The emulsion is then maintained at 31° C. during 20 min and finally slowly cooled to 20° C. at a rate of 0.1° C. min$^{-1}$. The stirring speed is slightly decreased; the pH is adjusted to 4.5 if necessary and 4.22 g of transglutaminase (ACTIVA® WM supplied by Ajinomoto) is added to the mixture. Cross-linking is allowed to proceed overnight at 20° C.

Figure 3:
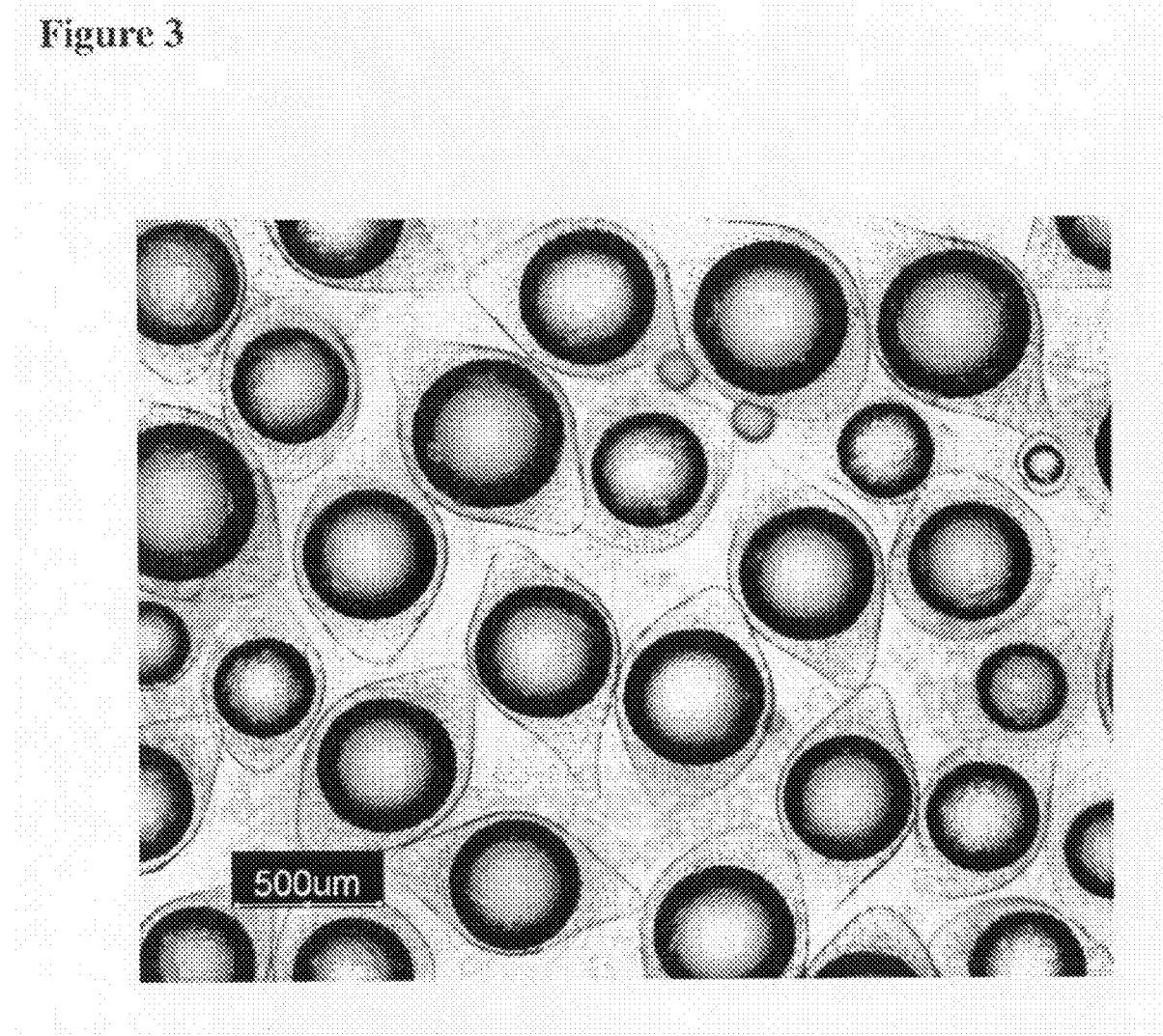
FIG. 3 is a microscopic view of the microcapsules obtained in Example 3.

The microcapsules thus obtained are shown in FIG. 3. The microcapsules have an average diameter of 250 μm.

Example 4

Microencapsulation According to the Invention with Beef Gelatine

Beef gelatine type B (275 Bloom-Kosher) having a gelling temperature above 32°, as determined by the methodology provided in the description, and gum Arabic (Efficacia®, from CNI) are used as the hydrocolloids. A stock solution of gelatine (solution A) is prepared by mixing 180 g of warm deionised water and 20 g of gelatine in a vessel until it is completely dissolved; the solution is then maintained at 40° C. A stock solution of gum Arabic (solution B) is prepared by mixing 180 g of cold deionised water and 20 g of gum Arabic in a vessel until it is completely dissolved; the solution is then warmed and kept at 40° C.

105.4 g of solution A is mixed with 70.3 g of solution B in a vessel under gentle agitation (the gelatine/gum Arabic ratio is 1.5:1). The system is diluted by the addition of 354.1 g of warm deionised water, which bring the total hydrocolloid concentration to 3.4% w/w. The solution is maintained at 40° C. and the pH is adjusted to 3.75 with a 50% w/w aqueous lactic solution. The mixture is then quickly cooled to 31° C. at a rate of 2° C. min$^{-1}$.

70.3 g of limonene is slowly added to the gelatine and gum Arabic mixture and homogenised with a stirrer at 350 RPM during 5 min, so as to reach an average droplet size of 300 μm. The emulsion is then maintained at 31° C. during 20 min and finally slowly cooled to 20° C. at a rate of 0.1° C. min$^{-1}$. The stirring speed is slightly decreased; the pH is adjusted to 4.5 if necessary and 4.22 g of transglutaminase (ACTIVA® WM supplied by Ajinomoto) is added to the mixture. Cross-linking is allowed to proceed overnight at 20° C.

An aqueous suspension of microcapsules is thus obtained. The microcapsules have an average diameter of 250 μm.

Example 5

Microencapsulation According to the Invention with Poultry Gelatine

Poultry gelatine (200 Bloom) having a gelling temperature above 32°, as determined by the methodology provided in the description, and gum Arabic (Efficacia®, from CNI) are used as the hydrocolloids. A stock solution of gelatine (solution A) is prepared by mixing 180 g of warm deionised water and 20 g of gelatine in a vessel until it is completely dissolved; the solution is then maintained at 40° C. A stock solution of gum Arabic (solution B) is prepared by mixing 180 g of cold deionised water and 20 g of gum Arabic in a vessel until it is completely dissolved; the solution is then warmed and kept at 40° C. 105.4 g of solution A is mixed with 70.3 g of solution B in a vessel under gentle agitation (the gelatine/gum Arabic ratio is 1.5:1). The system is diluted by the addition of 354.1 g of warm deionised water, which bring the total hydrocolloid concentration to 3.4% w/w. The solution is maintained at 40° C. and the pH is adjusted to 4.2 with a 50% w/w aqueous lactic solution. The mixture is then quickly cooled to 31° C. at a rate of 2° C. min−1.

70.3 g of limonene is slowly added to the gelatine and gum Arabic mixture and homogenised with a stirrer at 350 RPM during 5 min, so as to reach an average droplet size of 300 μm. The emulsion is then maintained at 31° C. during 20 min and finally slowly cooled to 20° C. at a rate of 0.1° C. min$^{-1}$. The stirring speed is slightly decreased; the pH is adjusted to 4.5 if necessary and 4.22 g of transglutaminase (ACTIVA® WM supplied by Ajinomoto) is added to the mixture. Cross-linking is allowed to proceed overnight at 20° C.

An aqueous suspension of microcapsules is thus obtained. The microcapsules have an average diameter of 250 μm.

The invention claimed is:

1. A method of micro-encapsulating a hydrophobic material by coacervation, which comprises:
   preparing a hydrocolloid solution by dissolving at least one gellable protein and, optionally, a non-protein polymer compound, in water;
   cooling the hydrocolloid solution to a temperature below the gelling temperature of a coacervate phase based on the protein;
   preparing, after the cooling step, an emulsion or suspension by emulsifying or suspending a hydrophobic material in the solution;
   forming a colloid wall comprising the protein around droplets or particles of the hydrophobic material present in an emulsion or suspension; and
   cross-linking the colloid wall to microencapsulate the hydrophobic material.

2. The method of claim 1, which comprises providing the coacervate phase based on protein by inducing phase separation in the solution.

3. The method of claim 1, in which the hydrophobic material is added to the solution with the solution having a temperature in the range of 22 to 32° C.

4. The method of claim 1, in which the protein is warm water fish gelatine.

5. The method of claim 1, in which the hydrophobic material comprises flavors, fragrances, fats, oils, mouth-feel enhancers, neutraceuticals, drugs, other bioactive ingredients or mixtures including several or more of the foregoing.

6. The method of claim 1, wherein the pH of the emulsion or suspension is adjusted to 4 to 5.5 prior to the cross-linking of the colloid wall.

7. A method of micro-encapsulating a hydrophobic material by coacervation, which comprises:
   preparing a hydrocolloid solution by dissolving at least one gellable protein and, optionally, a non-protein polymer compound, in water;
   cooling the hydrocolloid solution to a temperature below the gelling temperature of a coacervate phase based on the protein to at least partially form a gel of the protein in the solution;
   preparing, after the cooling step, an emulsion or suspension by emulsifying or suspending a hydrophobic material in the gel containing solution;
   forming a colloid wall comprising the protein around droplets or particles of the hydrophobic material present in the emulsion or suspension; and
   cross-linking the colloid wall to microencapsulate the hydrophobic material.

\* \* \* \* \*